United States Patent [19]

Chen et al.

[11] 4,374,813
[45] Feb. 22, 1983

[54] REVERSE-JET SCRUBBER APPARATUS AND METHOD

[75] Inventors: Gilbert K. Chen; Timothy L. Holmes, both of Wichita, Kans.

[73] Assignee: Koch Engineering Company, Inc., Wichita, Kans.

[21] Appl. No.: 251,277

[22] Filed: Apr. 20, 1981

Related U.S. Application Data

[63] Continuation-in-part of Ser. No. 149,148, May 14, 1980, abandoned.

[51] Int. Cl.$^3$ .............................................. C01B 17/00
[52] U.S. Cl. ........................................ 423/242; 55/89; 55/90; 55/228; 55/242; 55/257 PV; 55/259; 261/117; 261/79 A
[58] Field of Search .......... 55/90, 89, 93, 94, 257 PV, 55/242, 258, 259, 228, 240, 241; 261/112, 116, 117, 118, 79 A; 423/242 A

[56] References Cited

U.S. PATENT DOCUMENTS

| | | | |
|---|---|---|---|
| 1,222,541 | 4/1917 | Donham | 55/94 |
| 2,284,317 | 5/1942 | Greenberg | 55/90 |
| 3,409,409 | 11/1968 | Sackett | 55/259 |
| 3,572,264 | 3/1971 | Mercer | 261/117 |
| 3,631,656 | 1/1972 | Hausberg et al. | 261/117 |
| 3,803,805 | 4/1974 | Low | 55/73 |
| 3,907,526 | 9/1975 | Saleem et al. | 55/73 |
| 3,957,464 | 5/1976 | Teller | 55/89 |
| 4,067,707 | 1/1978 | Atsukawa et al. | 261/112 |
| 4,175,933 | 11/1979 | James | 55/240 |

FOREIGN PATENT DOCUMENTS

| | | | |
|---|---|---|---|
| 2627179 | 12/1976 | Fed. Rep. of Germany | 55/89 |
| 77930 | 11/1918 | Switzerland | 55/259 |
| 269714 | 4/1927 | United Kingdom | 55/228 |

Primary Examiner—Bernard Nozick
Attorney, Agent, or Firm—Richard P. Crowley

[57] ABSTRACT

A reverse-jet scrubber apparatus and method for removing gaseous contaminants, such as sulfur dioxide, and particulate matter from a combustion gas stream, employing low energy and reduced amounts of scrubbing liquid, which apparatus comprises: an elongated conduit; and a plurality of jet-spray nozzles centrally disposed and spaced apart from each other in the conduit and adapted to spray under high pressure a caustic scrubbing liquid countercurrently into a high-velocity, combustion gas stream, to form separate spray scrubbing zones covering the cross-sectional area of the conduit, whereby a combustion gas stream is scrubbed and a clear gas stream is recovered downstream of the scrubbing zones.

28 Claims, 7 Drawing Figures

REVERSE-JET SCRUBBER APPARATUS AND METHOD

REFERENCE TO PRIOR APPLICATION

This application is a continuation-in-part of U.S. Ser. No. 149,148, filed May 14, 1980 (now abandoned).

BACKGROUND OF THE INVENTION

The use of various scrubbing apparatuses and techniques for the removal of particulate matter and gaseous contaminants from air streams, in order to maintain a desired level of pollution control or product recovery, is well known. It is usually most desirable to remove particulate matter from gaseous combustion products, such as fly ash, as well as acidic gases, such as the oxides of sulfur or nitrogen, at high efficiencies and with low pressure drops. The removal of particulate matter and gaseous contaminants from oil-fired boilers, used for steam-flood secondary recovery in oil fields, is also desirable, but presents additional problems, because secondary recovery usually is a transient operation, taking place at one well or a few wells in remote locations.

Therefore, it is desirable to provide for a simple, effective, high-efficiency, low-pressure-drop, wet scrubber apparatus and method, particularly one which is economical and preferably skid-mounted or compact and portable, so that it may be moved economically and with ease from one well location to another well location.

One of the techniques for the scrubbing of particulate matter and effecting contact of a gas with a liquid is set forth, for example, in U.S. Pat. No. 3,803,805, issued Apr. 16, 1974, which describes a method of removing particulate material from gas streams through the use of at least one jet in a vertical column directed countercurrently to the gas within the vertical column, with the velocity of the liquid from the jet being of sufficient power and the gas-stream velocity maintained at a sufficient level over and above the flooding velocity of the liquid from the jet; that is, above the velocity necessary to suspend the liquid in the gas stream, creating, in effect, a reverse-jet apparatus. The technique disclosed, while effective in some respects, often requires a high expenditure of horsepower per square foot of a cross-sectional area, with the pressure drop being higher than desirable for some scrubbing operations, and with lower efficiency than is often desired in connection with effective removal of particulate matter and the removal of gaseous contaminants from the gas stream.

Therefore, it would be desirable to provide for an improved reverse-jet scrubber apparatus and method which overcome some of the disadvantages of the prior-art jet scrubber apparatuses, and also to provide for an improved reverse-jet scrubber apparatus having a high efficiency with a low pressure drop, and which operates with low energy requirements and reduced amounts of scrubbing liquid.

SUMMARY OF THE INVENTION

Our invention is directed to an improved reverse-jet scrubber apparatus and method and, in particular, to an improved reverse-jet scrubber apparatus comprising a complete compact or skid-mounted scrubber apparatus which may be positioned either in the vertical or horizontal position and is suitable for easy transportation and use in remote locations to treat gaseous combustion products, and which operates with low energy requirements and reduced amounts of scrubbing liquid.

It has been found that an improved reverse-jet scrubber apparatus, with low pressure drop and high efficiency, is formed when two or more jet-spray nozzles are employed in series in a gas-stream conduit and axially spaced apart by up to no more than about four hydraulic diameters of the conduit; for example, two to four conduit diameters. Additionally, the jet nozzles employed should have a pressure of greater than 100 psi, in order to provide for a refined particle size of less than a mean average of two-tenths of a percent of the cross-sectional diameter of the conduit. This provides for efficient scrubbing with at least two jets in series of at least about 95% efficiency and at a very low pressure drop; for example, a pressure drop of less than 2 inches at 1 jet horsepower per square foot of cross-sectional area of the conduit, wherein the average velocity of gas is at least 1000 feet per minute. Moreover, we have discovered that a nozzle-orifice-diameter-to-conduit-diameter ratio of 0.04 or less is highly effective in generating small droplets.

Additionally, it has been found that not only must high-pressure, jet-spray nozzles be employed in series and separate scrubbing zones be formed, but, optionally, the interior wall surface of the conduit be maintained in a wet condition, and that means be provided for wetting continually the peripheral interior wall surface during operation of the reverse-jet scrubber device, in order to avoid the accumulation of particulate matter about the peripheral interior surface area. In operation, reverse-jet scrubber apparatuses, without a peripheral wet wall, have reduced efficiency in that, during operation, the particulate matter builds up on the interior wall surface that would require periodic cleanup. Therefore, through our method, a dry interface is prevented and the problem of the removal of the accumulated dry reaction products and particulate matter from the gas chamber is avoided.

In prior-art reverse-jet scrubbers, such as the one described in U.S. Pat. No. 3,803,805, a dry/wet interface is created about the peripheral edges of the conical spray pattern, whereat the gas stream turns back the liquid spray, so that there is a peripheral area about the spray pattern, wherein the reaction products of the particulate material may build up, which is not wetted by the jet spray. It has been discovered that, in order to prevent a wet/dry interface, a liquid film, generally of a caustic scrubbing liquid or of the same solution as employed in the jet sprays, should be formed on the interior wall surface of the jet-spray nozzles, particularly throughout the wall surface covering the scrubbing operation, thereby preventing a wet/dry interface.

Our improved reverse-jet scrubber apparatus comprises in combination an elongaged body element, such as a cylindrical conduit, having an inlet and an outlet and having an interior surface wall, which conduit is adapted to permit passage therethrough from the inlet to the outlet of a gas stream, such as a gaseous combustion product from an oil-fire boiler and containing particulate matter and/or gaseous or liquid contaminants therein. The apparatus also comprises a means to introduce a high-velocity gas stream into the inlet and to remove from the outlet of the conduit a gas stream having reduced particulate matter and reduced gaseous contaminants. The apparatus particularly is adapted, for example, for the removal of finely-divided particulate matter derived from the operation of a combustion of a solid fossil fuel, such as oil and coal, and with the removal of acidic gaseous contaminants, such as through the use of aqueous alkaline or caustic solutions employed in the scrubbing apparatus and the reaction of the caustic in the solutions with the acidic gases, to form a solid particulate reaction by-product or a soluble by-product, which then may be removed.

Our reverse-jet scrubber apparatus may include a means to wet continually the interior peripheral wall surface of the conduit, particularly at that portion directed to or about the inlet and upstream of the first jet-spray nozzle; although, if desired, the peripheral means to wet the wall may occur both upstream and downstream of the jet-spray nozzles or between the jet-spray nozzles. The preferred embodiment is to provide for a continual wetting of the wall, such as with an aqueous solution, directly upstream of the first jet-spray nozzle and immediately adjacent the inlet to the conduit. The means to wet the interior peripheral wall surfaces provides for a generally continuous wet film over such wall surface, extending over a length as desired, depending on the cross-sectional area of the conduit employed; for example, from one-half to three times the diameter of the conduit. The interior peripheral wall surface may be wetted by a number of techniques, such as by the direct introduction of an alkaline solution onto the wall surface, or, more particularly, by the spraying of an aqueous caustic solution in a non-countercurrent direction, such as spraying at the inlet, concurrent with the gas stream, so that the passage of the gas stream carrying the fine spray drops will coat the interior wall surface, or, more particularly, by using one or more sprays peripherally surrounding the interior wall surface of the conduit, spraying generally perpendicular to or across the cross-sectional area of the conduit, to provide a continual wet film on the interior wall surface.

The wetting of the conduit wall surface upstream of the first jet-spray nozzle and upstream of the first scrubbing zone is particularly useful, where the combustion gas stream is very hot, so that rapid evaporation of the water of the scrubbing solution would occur, leading to the rapid deposition of solids at the forward edge of the first scrubbing zone, or where the gas stream to be scrubbed contains higher-than-normal amounts of solid particulate matter, such as fly ash. The use of a spray wetting means serves to quench and to cool the hot gas stream, so that solid buildup in the scrubbing zones is considerably reduced. Typically, the quenching of the hot gas stream upstream of the first scrubbing zone is usually sufficient to remove the problem of solid buildup in the subsequent scrubbing zones. Tangential spraying of the inlet of the conduit upstream of the first scrubbing zone has been found to be effective to wet continually the conduit wall surface.

Our reverse-jet scrubber device has particular utility when employed on a skid-mounted or otherwise portable operation and when the conduit is employed in a horizontal or generally horizontal position, with the particular jet-spray nozzles designed and employed to cover the entire cross-sectional area of the conduit, with the jet-spray nozzles coaxially located and spaced apart from one another within the conduit.

It is essential, in the operation of our reverse-jet scrubber, that the jet-spray means be employed within the general central portion of the conduit and comprise at least two, three or more separate jet-spray nozzles in a series, which jet-spray nozzles are coaxially aligned and spaced apart within the conduit, such as, for example, at a distance of from one to four times the hydraulic diameter of the conduit, and be positioned such that the conically emerging spray patterns, forming the cylindrical scrubbing zones of the liquid issuing from the jet-spray nozzles, do not substantially overlap each other. The hydraulic diameter is equal to four times the cross-sectional area of the conduit divided by the area of the wetted perimeter.

Typically, the jet-spray nozzles are disposed to spray a liquid solution, such as a caustic solution, directly into the gas stream passing from the inlet to the outlet of the conduit, with sufficient power to overcome at least the flooding velocity of the gas stream, with the gas stream having, for example, a velocity of generally more than 500 feet per minute; for example, 1000 or 1200 feet per minute or more, at atmospheric pressure. The spray patterns emerging from the jet-spray nozzles are such that the spray patterns, at their conical extremities, approach the wet wall surface and then are turned back by the oncoming gas stream, so as to form an essentially plug-type spray pattern within the interior and across the cross-sectional area of the conduit.

Our reverse-jet apparatus and method of operation are considerably different in structure and method from conventional spray towers for drying or scrubbing gases or other gas-scrubbing devices, where there occurs no reversal of the sprayed liquid by a high-velocity gas stream, or where the turnaround of the liquid is by gravitational force, and not the force of the gas stream to be scrubbed. The gas stream employed in our reverse-jet apparatus should have a gas-drag-force parameter of greater than about 4.0, where the drag-force parameter is calculated as follows:

$$F_s = v\sqrt{d}$$

where $F_s$ is the gas-drag-force parameter, v is the velocity of the gas in feet per second and d is the gas density in pounds per cubic foot. Thus, in a pressurized gas system, the gas density increases with a reduction of gas velocity, so that correction may be made to previous gas stream velocities at atmospheric pressure. The gas-drag-force parameter in our method must range from about 4.0 to 25; for example and preferably, 4.5 to 20.

The jet scrubber apparatus also includes means to introduce the water or liquid solution countercurrent to the gas stream and to the jet-spray nozzles under a sufficient pressure, so that the average mean particle size of the droplets formed will be two-tenths of a percent of the conduit cross-sectional diameter, or, for example, to form, with a mean average diameter, droplets of up to 2000 microns; for example, 500 to 2000 microns. Typically, jet-spray-nozzle pressures are employed which are greater than 100 psi, such as, for example, from over about 60 to 350 psi, and more particularly, for example, 125 to 200 psi; for example, about 150 psi. The liquid solution should be introduced at sufficient nozzle pressure, to overcome the force of the gas stream for a short distance, and sufficient to form the conical spray patterns to cover substantially the cross-sectional area of the interior of the conduit.

The reverse-jet scrubber apparatus also includes means to withdraw a gas stream having reduced particulate matter and gaseous contaminants, due to the gas-/solid/liquid contact effected by the gas stream's passing through at least two of the spray patterns formed by the two or more spray nozzles.

Our scrubber apparatus should also include a gas-liquid separator directly downstream from the last jet-spray nozzle and scrubbing zone, and provide for the recycling of the liquid droplets captured by the liquid separator for reuse by each of the jet-spray nozzles. Gas-liquid separators which may be employed in our scrubber apparatus include, for example, chevron-type and wire-mesh separators. Various types of gas-liquid separators are disclosed in U.S. Pat. Nos. 2,521,785; 2,812,034; 3,338,035; and 3,571,486.

Our method of operating and employing the reverse-jet scrubber apparatus to remove particulate matter from a gas stream is particularly advantageous in combination with the use of fiber-bed mist eliminators at the outlet or discharge end of the separator. Typically, such fiber-bed mist eliminators may not be employed directly with a particulate-containing gas stream, due to the fine diameter size of the fiber-bed mist eliminator, such as a glass-fiber diameter of 100 microns to 1 micron. The fiber-bed mist eliminator rapidly becomes plugged with larger particulate matter. The efficiency of our reverse-jet scrubbing method, in removing large-type particulate matter at a high efficiency level, permits the use of a fiber-bed mist eliminator at the discharge or outlet end of the reverse-jet scrubber and the operation thereof for considerable periods of time, without affecting and plugging up the fiber-bed mist eliminator.

Thus, it is advantageous to provide for a fiber-bed-type mist eliminator downstream from the separator and prior to the outlet of the conduit, so that submicron particles of liquid entrained in the gas stream may be removed effectively, without plugging the fiber bed. Typically, the fiber-bed mist eliminator is designed to capture particles of 40 microns or less from the gas stream, while the other type of separators is employed to capture larger particles.

In operation, the gas stream is passed from the inlet to the outlet of the conduit and through the plug-like zones of the spray patterns maintained within the conduit. The interaction of the finely-divided liquid droplets with the gas stream removes particulate matter and reacts with gaseous contaminants in the gas stream. The pollutant-laden liquid droplets subsequently are removed and collected by the liquid separator and/or the mist eliminator and recycled for reuse, and a particulate-free, gaseous-contaminant-free gas stream is removed at the outlet end of the conduit.

For the purpose of illustration only, our invention will be described in connection with certain preferred embodiments; however, it is recognized that those persons skilled in the art may make various changes and modifications in our invention and apparatus, all without departing from the spirit and scope of our invention. For example, our apparatus may be employed horizontally, vertically or at other orientation with respect to the ground necessary for operation. Further, although our device is shown with single spray nozzles creating each plugged spray zone, multiple spray nozzles, with combined spray patterns which substantially cover the cross-section of the conduit, may be substituted for the single spray nozzles. Additionally, other types of gas-liquid separators may be substituted for the wire-mesh and chevron-type separators described herein. Moreover, our apparatus may be used not only in scrubbing particulate and gaseous contaminants from a hot gas stream, but, for example, to cool a hot gas to a temperature slightly above the adiabatic saturation temperature.

DESCRIPTION OF THE EMBODIMENTS

Figure 1:
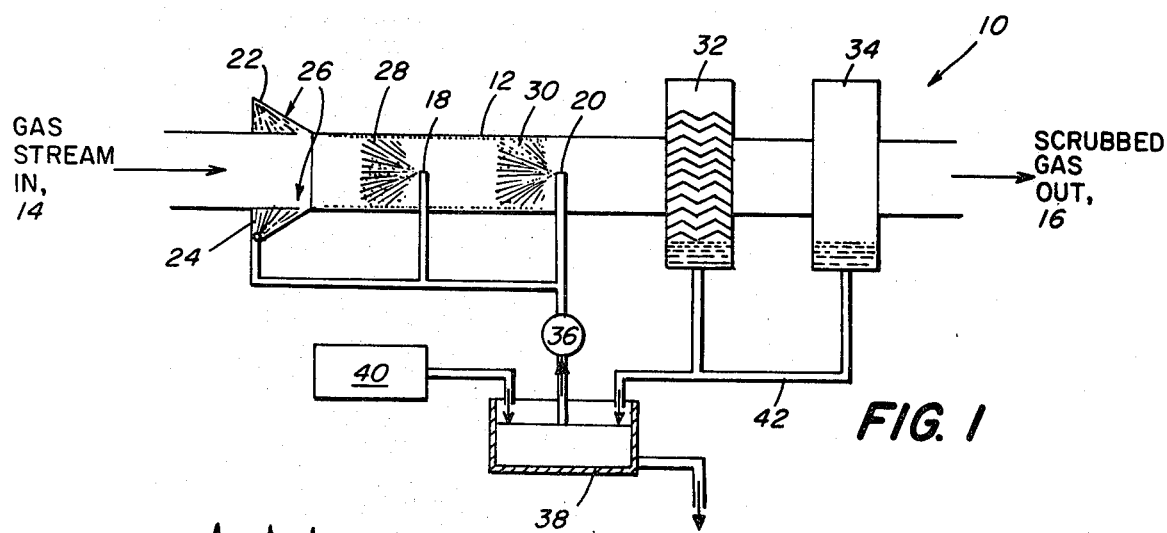
FIG. 1 is a schematic illustration of a reverse-jet scrubber apparatus of the invention.
Figure 2:
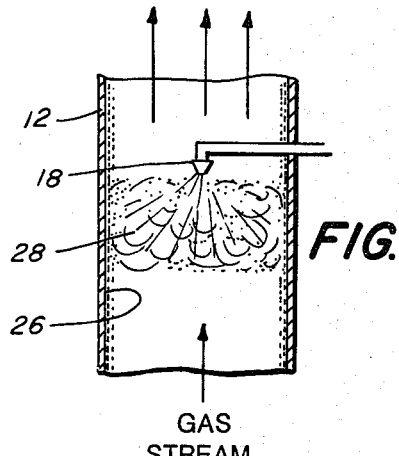
FIG. 2 is an enlarged, fragmentary, schematic, cross-sectional view of a portion of the first jet-spray nozzle and the spray pattern therefrom, together with the peripheral film formed on the interior surface.

FIG. 1 shows a reverse-jet scrubber apparatus 10 of the invention comprising an elongated cylindrical conduit 12 having an inlet 14, for the introduction of gas with fly ash and sulfur dioxide, and an outlet 16 at the other end, for the withdrawal of clean air to a stack or to the atmosphere. Within the conduit 12 are positioned two coaxially aligned jet-spray nozzles 18 and 20 spaced apart approximately one to four diameters of the conduit 12. Upstream of of the jet-spray nozzles 18 and 20 is a series of peripheral spray jets 22 and 24, as illustrated, about the interior wall surface of the conduit 12, to direct sprays essentially across the cross-sectional diameter of the conduits, to form a continuous wet film of liquid 26 on the interior wall surface of the conduit 12. The thin liquid film may extend from upstream of the jet-spray nozzle 18 to downstream of the last jet-spray nozzle 20. The general spray patterns 28 and 30 of the jet sprays are shown more particularly in FIG. 2, wherein the plug from of spray patterns, developed by the reverse spraying into the oncoming gas stream of a conical spray through the jet-spray nozzle 18, forms a plug-type spray pattern 28 within and across substantially the entire cross-sectional area of the conduit 12 as shown.

Downstream of the last jet-spray nozzle 20 is shown a gas-liquid separator, typically a chevron-type separator 32, and downstream thereof is a fiber-bed mist eliminator 34 adapted to remove very fine micron particle-size material which is not removed by the gas-liquid separator 32. A scrubbing liquid, for example, of a caustic solution of sodium hydroxide or soda ash 40, is employed and periodically is added to a recycle bath 38 in which the material is drawn through a pump 36 and introduced into the jet-spray nozzles 18, 20, 22 and 24. Scrubbing liquid recovered from the scrubbed gas by separator 32 and mist eliminator 34 is recycled by line 42 to bath 38 for reuse, while spent scrubbing liquid is discharged as fresh scrubbing liquid is added from source 40.

Figure 3:
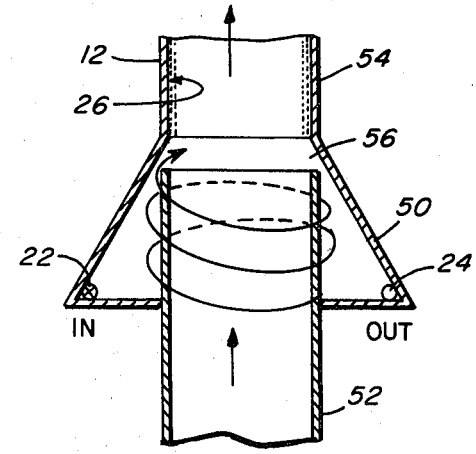
FIG. 3 is an enlarged, fragmentary, schematic, cross-sectional view of a portion of FIG. 1.

In FIG. 3, the interior wall wetting means comprises a hollow, truncated, conical collar 50 which connects an upstream segment of the conduit 52 to a downstream segment 54. The two segments 52 and 54 are separated by a small annular gap 56; for example, the gap 56 may be ¼-inch wide or less. The gap 56 provides fluid communication between the interior of the collar 50 and the interior of the conduit 12. At the base of conical collar 50 are two opposing tangential jet nozzles 22 and 24 through which scrubbing liquid is introduced. In operation, the scrubbing liquid 26 is sprayed through tangential nozzles 22 and 24. A swirling liquid spray is created which is drawn up through the conical collar 50 and through gap 56 and into the conduit 12, to form a thin liquid film on the interior wall, which prevents a dry-wet interface.

Figure 4:
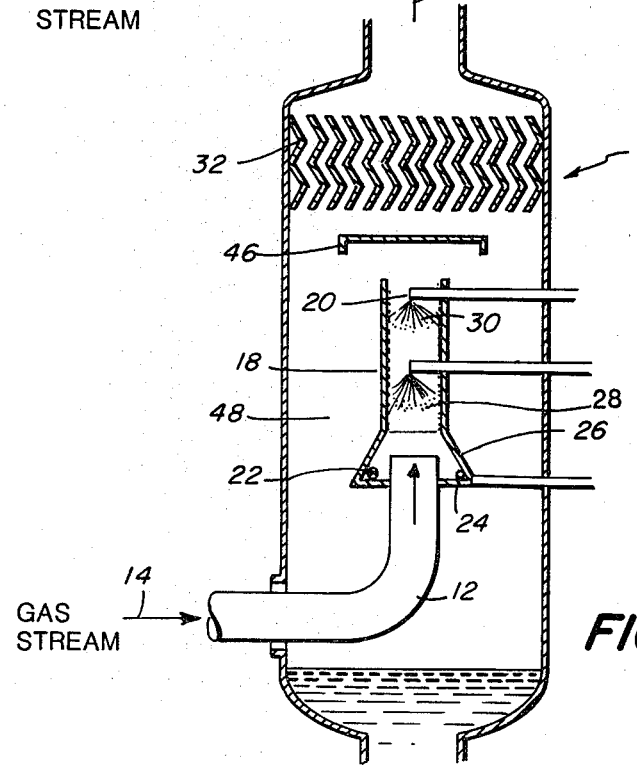
FIG. 4 is a schematic illustration of an alternative embodiment of our scrubber encapsulated in a baffled chamber.

In FIG. 4, an alternative embodiment is shown, wherein the jet scrubbers and the separator are encapsulated in a baffled chamber or tower 44. The gas stream conduit 12 enters the chamber 44 via inlet 14 at or near the bottom, and the gas is exposed to the jet-spray patterns 28 and 30, as the conduit 12 rises in the chamber 44. Spray nozzles 18, 20, 22 and 24 are identical to their counterparts in FIG. 1. The conduit 12 terminates in the chamber, and a baffle plate 46 is located between the end of the conduit and a chevron-type separator 32 at the top of the chamber. Scrubbed gases passing out of the conduit 12 will be deflected into and about the chamber through reducing their velocity and increasing the liquid-removal efficiency of the separator 32. Upstream of the separator 32 and at the top of the chamber 44 is the outlet 16 for the removal of the scrubbed gas stream.

The embodiment of FIG. 4 is useful particularly in the conversion of existing packed towers or chambers, where the packing tends to become plugged with solid particulate material from the treated or scrubbed gas stream. In this case, the tower packing, such as pall rings, raschig rings or saddles or other packing, may be removed and a reverse-jet scrubber apparatus installed within the existing chamber.

Figure 5:
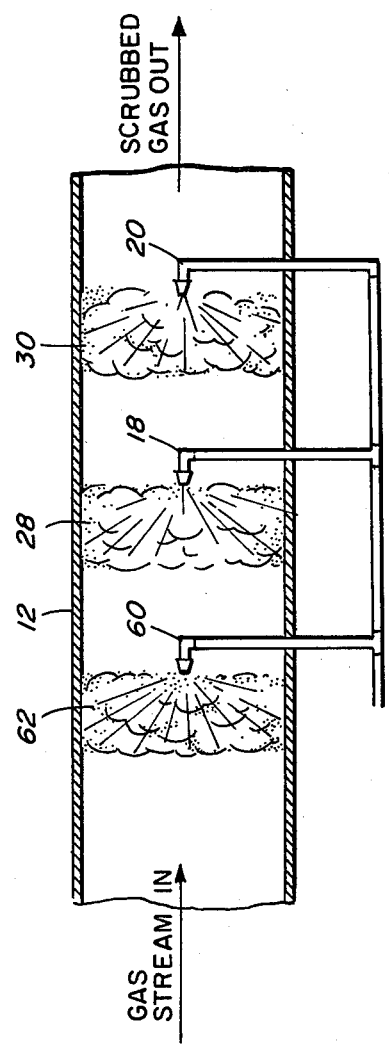
FIG. 5 is a fragmentary, schematic, cross-sectional view of a reverse-jet scrubber apparatus of the invention showing three separate single nozzle scrubbing zones.

FIG. 5 illustrates a reverse-jet scrubber apparatus of the invention wherein the conduit 10 includes three separate, spaced-apart, single-nozzle scrubbing zones rather than the two scrubbing zones illustrated in the apparatus of FIG. 1. In this embodiment a separate nozzle 60 to provide a third scrubbing zone 62 is illustrated.

Figure 6:
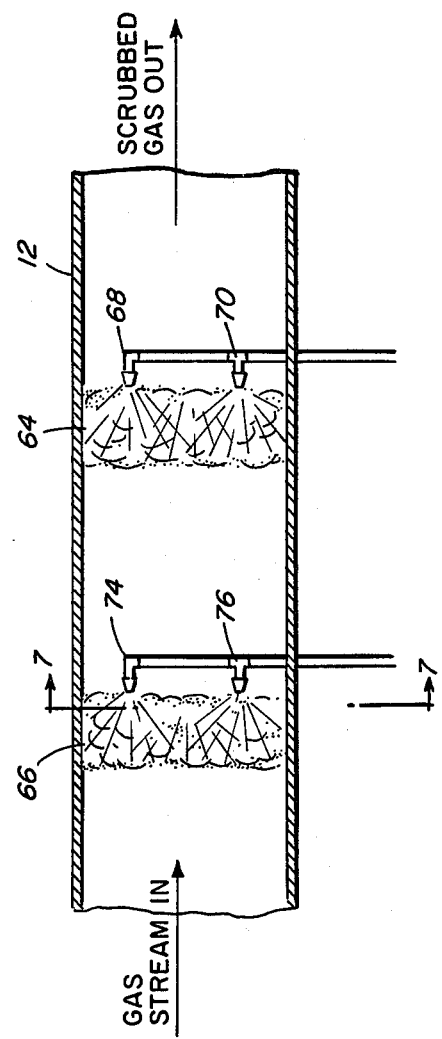
FIG. 6 is a fragmentary, schematic, cross-sectional view of a reverse-jet scrubber apparatus of the invention showing two separate scrubber zones, each zone having a plurality of spray nozzles.
Figure 7:
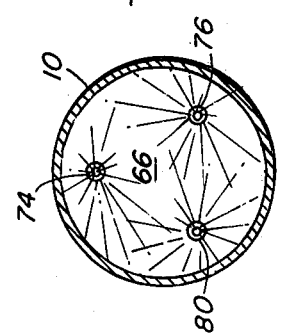
FIG. 7 is a front sectional schematic view of one scrubbing zone of FIG. 6 along the line 7—7.

FIGS. 6 and 7 illustrate a plurality of separate, spacedpart scrubbing zones 64 and 66 as in FIG. 1, but formed by a plurality, e.g., three, of separate spray nozzles 68, 70 and 72 in zone 64 and 74, 76 and 80 in zone 66.

The spray nozzles in each zone are positioned and arranged to form a plug-like scrubbing zones 64 and 66 which substantially cover the cross section of the conduit 12.

In operation, gaseous combustion products, containing particulate matter and sulfur dioxide, are introduced into the inlet 14 under pressure at a velocity of greater than 500 feet per minute, and typically greater than 1000 feet per minute, and with a gas-flow-drag parameter of about 4.5; for example, 4.5 to 10.0. Jet-spray nozzles 22 and 24 spray a caustic solution which forms a continual wet film 26 on the interior wall surface of the conduit 12, which avoids a wet/dry interface between the wet film 26 and the spray patterns 28 and 30 of the jet-spray nozzles 18 and 20. The gas passes through the spray plug of the spray patterns 28 and 30 of the conduit, wherein vigorous contact between the particulate matter and the fine-particle-size droplets of the spray patterns occurs. The caustic solution, for example, a 5% to 10% sodium hydroxide solution or other alkali-like soda ash, is introduced from the source 40 into the recycle bath 38 by the pump 36 and into the jet-spray nozzles 18, 20, 22 and 24. The gas stream, from which the particulate matter is scrubbed and from which the sulfur dioxide reacts with the fine-particle-size droplets in the spray patterns 28 and 30 and containing liquid droplets entrained therein, is passed through a chevron-type gas-liquid separator 32, from which the gross liquid droplets are removed, collected and recycled via line 42 through the recycle bath 38 and, hence, reused. Downstream of the chevron separator 32, the gas stream is passed through a glass-fiber-bed mist eliminator to remove particles of less than 40 microns, which are also recycled to bath 38, and the clean scrubbed air is then discharged to the stack.

In the described operation, the use of the even wet film upstream of the jet-spray nozzles 18 and 20 is optional. The scrubbing liquid is introduced into the jet-spray nozzles 18 and 20 at a pressure of about 125 to 150 psi, which provides liquid scrubbing particles of about 500 to 2000 microns in diameter. The force of the jet sprays overcomes initially the force of the gas stream to form the separate plug-like scrubbing zones 28 and 30 directly upstream of each jet nozzle. The gas stream, at high velocity, passes through the scrubbing zones 28 and 30. It has been found that the use of separate, spaced-apart, jet nozzles, to provide separate scrubbing zones in series in the conduit, provides for removal of typically over 99% of the sulfur dioxide in the gas stream and over 75% of the solid particulate matter in the gas stream. This high efficiency is accomplished with the use of about one-third or more less energy than consumed in the single, reverse-jet-spray operation of U.S. Pat. No. 3,803,805, and with the use of considerably less scrubbing liquid; for example, up to 50% less scrubbing liquid. Thus, the employment of high-pressure spray patterns in multiple scrubbing zones in a reverse-jet apparatus provides significant advantages in scrubbing hot combustion gases.

Examples are presented herewith to delineate the improvement and utility of this invention over the prior art. As part of these examples, a comparison was made between the air-water pressure drop of our invention and that of the prior art, single-jet device described in U.S. Pat. No. 3,803,805. Our apparatus was tested with two jets in series. A comparison of system geometries is given in Table I.

TABLE I

| | Comparative Geometries | |
| --- | --- | --- |
| Item | Apparatus Disclosed Herein | Apparatus Disclosed in U.S. Pat. No. 3,803,805 |
| Type of gas flow | horizontal | vertical |
| Type of spray nozzle | 30° solid cone | 30° solid cone |
| Gas velocity, fpm | 2000–36000 | 1500–4000 |
| Jet liquid loading, GPM/1000 CFM | 8–16 (two jets in series) | 13–93 (one jet) |
| Nozzle orifice diameter/ conduit diameter | .011–.019 | .048–.063 |

Examples 1 and 2 pertain to $SO_2$ removal by NaOH scrubbing, while Example 3 describes mist removal by water scrubbing.

EXAMPLE 1

This example illustrates the use of the reverse-jet scrubber for removal of $SO_2$ from a combustion gas stream. A 125° F. combustion gas stream containing 2562 ppm (vol) $SO_2$ was introduced to the inlet of the 6 7/16-inch ID scrubber conduit at a gas velocity of 41 ft/sec. An 80° F. recycle caustic stream containing 20% dissolved solids at a pH of 6.8 was sprayed into this gas stream with two nozzles in series at a rate of 7.84 GPM/1000 cfm and a spray nozzle pressure drop of 175 psi. 3/32-inch and 5/64-inch orifice nozzles were used in series, with the 5/64-inch orifice in the upstream position. The gas-phase pressure drop was measured and found to be 2.4 inches of water, and the $SO_2$ content of the gas stream leaving the chevron separator downstream of the reverse-jet scrubber was 175 ppm, to yield an SO2 removal efficiency of 93.2%. The pH and dissolved solids content of the caustic stream were maintained constant throughout this test by adding 660 cc/min of 8.9% NaOH to the recycle tank and by blowing down 660 cc/min of spent scrub liquor. The temperature of the gas stream leaving the chevron separator was measured and found to be 80° F., which is identical to the temperature of the scrub liquor stream. In addition to an excellent $SO_2$ scrubber, the reverse-jet system is an excellent gas-quenching device.

EXAMPLE 2

This example further illustrates the use of the reverse-jet scrubber for removal of $SO_2$ from a gas stream. A room-temperature air stream containing 480 ppm (vol) $SO_2$ was introduced to the inlet of the pilot-scale, 6 7/16-inch ID scrubber conduit at a gas velocity of 42.9 ft/sec. A 54° F. recycle caustic stream, containing 17.3wt.% dissolved solids at a pH of 6.8, was sprayed into the gas stream with two nozzles in series at a rate of 7.48 GPM/1000 cfm and a spray-nozzle pressure drop of 170 psi. 3/32-inch and 5/64-inch orifice nozzles were used in series, with the 5/64-inch orifice in the upstream position. The $SO_2$ content of the gas stream leaving the chevron separator downstream of the reverse-jet scrubber was measured and found to be 28 ppm, to yield an $SO_2$ removal efficiency of 94.2%. The pH and dissolved solids content of the caustic stream were maintained constant throughout this test by adding 200 cc/min of 8.9% NaOH to the recycle tank and by blowing down 200 cc/min of spent scrub liquor. Approximately the same $SO_2$ removal efficiency was realized in this test, at significantly lower inlet $SO_2$ concentration in the gas stream, as was observed for the test described in Example 1.

EXAMPLE 3

This example illustrates the use of the reverse-jet scrubber for particulate or mist removal. A room-temperature air stream containing 2.86 mg/ft$^3$ of 1.41 mass-median-size dioctyl phthalate (DOP) mist was admitted to the inlet of the pilot-scale reverse-jet scrubber at a velocity of 33.7 ft/sec. This mist-laden gas was contacted with 9.74 gpm/1000 cfm of water with two spray nozzles in series at a nozzle pressure drop of 150 psi, the orifice diameters of the nozzles being the same as in the previous examples. Inlet and exit mist-loading and particle-size distributions were determined by cascade impactor sampling. At a gas-phase pressure drop of 2.4 inches of water, the overall DOP mist removal was found to be 83.1%. The gas stream flowing from the chevron separator was found to contain only 0.483 mg/ft$^3$ of DOP mist.

Finally, in Table II, a comparison is made between the pressure drop of our apparatus and the pressure drop of the apparatus disclosed in U.S. Pat. No. 3,803,805 at various jet-horsepower levels. The data for the device of U.S. Pat. No. 3,803,805 was taken from FIG. 5 of the patent, while the data for our apparatus was derived from tests with the above-described pilot plant.

TABLE II

| | Pressure drop - inches H$_2$O | |
|---|---|---|
| Jet Horsepower per square foot | Two-jet, small orifice apparatus disclosed herein | Apparatus of U.S. Pat. No. 3,803,805 |
| 1.0 | 1.2 | 3.6 |
| 2.0 | 2.0 | 6.6 |
| 3.0 | 2.8 | 9.2 |

As Table II indicates, our apparatus yielded significantly better pressure-drop results. The improved results are attributable to: lower liquid loadings permitted by our apparatus and method; and much smaller ratios of nozzle-orifice diameters to conduit diameters.

For most scrubbing operations, our apparatus will provide excellent particulate scrubbing and gas absorption, when a liquid loading of 5 to 10 GPM/1000 cfm per jet is used, and when two or three jets in series are employed.

What we claim is:

1. An improved reverse-jet scrubber apparatus for scrubbing particulate matter and gaseous contaminants from a gas stream, which apparatus comprises in combination:
   (a) an elongated conduit having an inlet at the one end for the introduction of the gas stream to be scrubbed and an outlet at the other end for the discharge of a scrubbed gas stream, the conduit having an interior wall surface and a defined diameter;
   (b) jet-spray means within the conduit comprising at least two jet-spray nozzles in series and spaced apart from each other within the conduit at not greater than about four times the hydraulic diameter of the conduit;
   (c) means to introduce a scrubbing liquid into the jet-spray nozzles and to spray the scrubbing liquid countercurrent to the passage of the gas stream from the inlet to the outlet, the scrubbing liquid sprayed under sufficient force and pressure to overcome initially the force of the gas stream to form scrubbing zones, each scrubbing zone covering substantially the cross-sectional area of the interior of the conduit, and each scrubbing zone not overlapping substantially with any other scrubbing zone, whereby the gas stream to be scrubbed, having a gas-flow parameter of 4.0 or greater, passes through the scrubbing zones at a high velocity, to provide a scrubbed gas stream containing entrained liquid material;
   (d) a wetting means comprising a hollow, truncated, conical collar element disposed and axially aligned generally with the smaller diameter end facing and upstream of the jet-spray means and spaced apart from said conduit by a small, annular gap, which gap provides fluid communication between the interior of the collar element and the interior of the conduit;

(e) tangential, jet-spray nozzles at the base of the collar element, to provide a swirling liquid spray of the scrubbing liquid solution, whereby the swirling liquid spray passes through the gap and into the interior of the conduit and forms a thin liquid film on the interior peripheral wall of the conduit;

(f) gas-liquid separator means downstream of the jet-spray means to separate the entrained liquid material from the scrubbed gas stream; and (g) means to withdraw the separated, entrained liquid material for disposal or reuse in the jet-spray means, whereby a gas stream to be scrubbed is introduced into the inlet of the conduit, and having a gas-flow parameter of 4.0 or greater, and is scrubbed with scrubbing liquid in the scrubbing zone, and a scrubbed gas stream with reduced particulate matter and gaseous contaminants is discharged from the outlet of the conduit.

2. The apparatus of claim 1 wherein the elongated conduit is disposed in a generally horizontal relationship.

3. The apparatus of claim 1 wherein each scrubbing zone is formed by a single jet-spray nozzle and the ratio of the spray-nozzle orifice to the conduit diameter is less than about 0.04.

4. The apparatus of claim 1 wherein the jet sprayers comprise three or more substantially coaxially aligned jet-spray nozzles in series.

5. The apparatus of claim 1 wherein the jet-spray nozzles are coaxially aligned and separated by a distance about equal to the hydraulic diameter of the conduit.

6. The apparatus of claim 1 wherein the jet-spray nozzles are separated by a distance of about two to four times the hydraulic diameter of the conduit.

7. The apparatus of claim 1 wherein the gas-liquid separating means comprises a chevron blade-type, gas-liquid separator.

8. The apparatus of claim 1 which further comprises, downstream of the gas-liquid separator means, a fiber-bed mist eliminator adapted to receive the gas stream from the gas-liquid separator and to remove entrained materials having a particle size of less than about 100 microns, prior to discharging the scrubbed gas stream from the outlet.

9. The apparatus of claim 1 wherein the means to withdraw the separated liquid material comprises:

(a) bath means to retain a scrubbing liquid;

(b) means to recycle the separated liquid material to the bath means;

(c) means to add fresh scrubbing liquid to the bath means; and (d) means to blow down spent scrubbing liquid in the bath means, so as to prevent an adverse buildup of particulates or reactive by-products in the bath means and to maintain a desired level of scrubbing liquid in the bath means.

10. The apparatus of claim 1 wherein the jet-spray means includes a pump means to introduce the scrubbing liquid into the jet-spray nozzles at a pressure of from 100 to 200 psi, and wherein each jet-spray-nozzle-orifice diameter to conduit diameter ranges from about 0.011 to 0.019.

11. The apparatus of claim 1 which includes baffle means downstream of the jet-spray means, at reduced velocity of the scrubbed gas stream, thereby increasing the efficiency of liquid-material removal in the gas-liquid separator means.

12. The apparatus of claim 1 which includes a generally vertical chamber of larger diameter than the elongated conduit, and having an outlet at the top thereof for the removal of a scrubbed gas stream from the chamber, and wherein the elongated conduit is disposed in a generally central and vertical position within the chamber, whereby a gas stream to be scrubbed is introduced into the inlet and passes upwardly through the scrubbing zones and a scrubbed gas stream is discharged from the outlet of the chamber.

13. A method for scrubbing particulate material and gaseous contaminants from a high-velocity gas stream having a gas-drag parameter of 4.0 or greater, which method comprises:

(a) passing the gas stream through an elongated conduit having an inlet for introducing the gas stream to be scrubbed, and an outlet for the discharge of a scrubbed gas stream, the elongated conduit characterized by an interior wall surface;

(b) forming a plurality of plug-like, separate scrubbing zones within the conduit by spraying an alkaline scrubbing liquid countercurrent to the flow of the gas stream under sufficient force and pressure, to overcome initially the force of the gas stream, the scrubbing zones covering substantially the cross-sectional area of the conduit, and each scrubbing zone not overlapping substantially with any other scrubbing zone, to provide a pressure drop of the gas stream of about 2.8 inches of water or less in each scrubbing zone;

(c) passing the gas stream to be scrubbed through the scrubbing zones to obtain a scrubbed gas stream;

(d) separating liquid material from the scrubbed gas stream; and (e) discharging a scrubbed gas stream.

14. The method of claim 13 which includes wetting the peripheral interior wall surface of the conduit upstream of the first scrubbing zone with a thin film of a scrubbing liquid.

15. The method of claim 13 which comprises forming two or three scrubbing zones, with the scrubbing liquid forming particles of from about 500 to 2000 microns in diameter.

16. The method of claim 13 which includes forming the scrubbing zones by spraying the scrubbing liquid from jet-spray nozzles at a pressure of from about 100 to 200 psi.

17. The method of claim 13 wherein the gas stream to be scrubbed has a gas-drag parameter of from about 4.5 to 20.

18. The method of claim 13 which includes spraying the alkaline scrubbing liquid at a rate of from about 5 to 10 gallons per minute for each 1000 cubic feet per minute of gas stream passing through the conduit.

19. The method of claim 13 which includes wetting the peripheral interior wall surface of the conduit upstream of the first scrubbing zone by tangentially spraying a scrubbing liquid across the cross-sectional area of the conduit.

20. The method of claim 13 wherein two or three separate scrubbing zones are employed, the scrubbing liquid is a soda-ash-containing scrubbing liquid, and 75% or more of the particulate matter and 99% or more of sulfur dioxide are removed from the gas stream.

21. The method of claim 13 which includes disposing the elongated conduit in a generally horizontal position.

22. The method of claim 13 which includes forming each scrubbing zone by a single spray nozzle, with the ratio of the spray-nozzle orifice to conduit diameter being less than about 0.04.

23. The method of claim 13 which includes separating the scrubbing zones by a distance of about two to four times the hydraulic diameter of the conduit.

24. The method of claim 13 which includes spraying the scrubbing liquid at a pressure of greater than about 100 psi 25. The method of claim 21 wherein the ratio of the jet-spray-nozzle-orifice diameter for spraying the liquid to conduit diameter ranges from about 0.011 to 0.019.

26. The method of claim 13 which includes:

(a) employing a gas-liquid separator downstream of the scrubbing zones, to remove entrained liquid from the scrubbed gas stream;

(b) employing a mist eliminator downstream of the gas-liquid separator, to remove additional scrubbing liquid from the gas stream; and (c) recovering the scrubbing liquid from the gas-liquid separator and mist eliminator and recycling the recovered scrubbing liquid.

27. The method of claim 13 which includes reducing the velocity of the gas stream downstream of the scrubbing zones, to increase the efficiency of removal of the the scrubbing liquid from the reduced velocity gas stream.

28. The method of claim 13 wherein the pressure drop is 2.0 inches of water or less.

* * * * *